(12) United States Patent
Jakob (10) Patent No.: US 8,701,876 B2
(45) Date of Patent: Apr. 22, 2014

(54) CLIPS FOR ATTACHING STAPLES FOR JOINING CONVEYOR BELT ENDS AND CLIP-STAPLE ASSEMBLIES

(75) Inventor: Horst Jakob, Deaux (FR)

(73) Assignee: ASER, Saint-Chamont (FR)

( * ) Notice: Subject to any disclaimer, the term of this patent is extended or adjusted under 35 U.S.C. 154(b) by 898 days.

(21) Appl. No.: 12/595,496

(22) PCT Filed: Apr. 10, 2008

(86) PCT No.: PCT/FR2008/000501
§ 371 (c)(1),
(2), (4) Date: Apr. 21, 2010

(87) PCT Pub. No.: WO2008/142280
PCT Pub. Date: Nov. 27, 2008

(65) Prior Publication Data
US 2010/0200374 A1    Aug. 12, 2010

(30) Foreign Application Priority Data

Apr. 10, 2007  (FR) ...................................... 07 02650

(51) Int. Cl.
*B65G 17/00*   (2006.01)
*F16G 3/00*    (2006.01)
(52) U.S. Cl.
CPC ........................................ *F16G 3/00* (2013.01)
USPC ........................................ 198/844.2; 24/33 B
(58) Field of Classification Search
USPC ............ 198/844.1, 844.2; 474/253, 255, 257;
411/461–463, 921; 24/31 R, 31 B, 31 F,
24/31 L, 31 H, 33 R, 33 A, 33 F, 33 P, 33 L,
24/33 B, 33 C
See application file for complete search history.

(56) References Cited

U.S. PATENT DOCUMENTS

| | | | | |
|---|---|---|---|---|
| 792,135 A | * | 6/1905 | Jackson | 411/365 |
| 1,092,859 A | * | 4/1914 | Purple | 24/33 P |
| 1,479,915 A | * | 1/1924 | Hulse | 24/33 B |
| 1,727,574 A | * | 9/1929 | Tibbals | 59/77 |
| 1,765,080 A | * | 6/1930 | Latimer | 24/31 R |
| 2,132,295 A | * | 10/1938 | Hawkins | 411/473 |
| 2,935,774 A | * | 5/1960 | Schick | 24/33 B |
| 2,983,974 A | * | 5/1961 | Tebb et al. | 148/599 |

(Continued)

FOREIGN PATENT DOCUMENTS

FR    897 662 A    3/1945
FR    1 185 742 A    8/1959

*Primary Examiner* — William R Harp
(74) *Attorney, Agent, or Firm* — Blank Rome LLP (57) ABSTRACT

A clip for attaching a staple that joins conveyor belt ends that comprises a top portion and a plurality of claws that extend substantially perpendicular from the top portion and are adapted to extend through corresponding holes in the staple. The top portion is formed of a metal sheet, the configuration of which corresponds to that of an accommodation recess provided in a top plate of the staple. The top portion bears at least two claws of the plurality of claws. Each of the claws is connected to the top portion by a bend and each bend includes a re-entrant reinforcing rib embossed therein. Each reinforcing rib is provided in the longitudinal direction of the respective claw approximately in the middle of the width of the respective claw. The claws are formed either by bending the metal sheet at the bends or by attaching the claws to the metal sheet.

10 Claims, 6 Drawing Sheets

(56) References Cited

U.S. PATENT DOCUMENTS

| | | | |
|---|---|---|---|
| 4,220,070 A * | 9/1980 | Anstett | 411/444 |
| 4,607,638 A * | 8/1986 | Crainich | 606/219 |
| 5,095,590 A * | 3/1992 | Schick | 24/33 B |
| 5,529,451 A * | 6/1996 | Bruins et al. | 411/482 |
| 5,638,582 A * | 6/1997 | Klatt et al. | 24/33 P |

* cited by examiner

PRIOR ART fig. 2 fig. 3 fig. 4 fig. 5 fig. 6 fig. 7 fig. 8 fig. 9

CLIPS FOR ATTACHING STAPLES FOR JOINING CONVEYOR BELT ENDS AND CLIP-STAPLE ASSEMBLIES

CROSS-REFERENCE TO RELATED APPLICATIONS

This application is a National Phase Application of PCT/FR2008/000501, filed on Apr. 10, 2008, which claims priority to French Application No. FR 0702650, filed on Apr. 10, 2007, the contents of which are hereby incorporated by reference.

FIELD OF THE INVENTION

The present invention relates to clips intended for attaching conveyor belt ends with staples that join the conveyor belt ends. In addition, the invention relates to a clip-staple assembly attaching both elements to each other prior to positioning the staples on the conveyor belt ends.

BACKGROUND OF THE INVENTION

Known joining staples for conveyor belts, belts, and similar products are composed of a top plate and a lower plate connected at one end by one or several narrower parts called knuckles, wherein the staples are mounted in alternating series at one end of the conveyor belt with a portion of the conveyor belt being disposed between the top plates and the lower plates of the staples in each series, and wherein the same operation is carried out again on the other end of the conveyor belt while shifting the knuckles of the second series of staples with respect to those of the first series so that the knuckles of the second series are engaged between the knuckles of the first series. A connecting and articulating rod is then engaged into one knuckle of a series of staples and then into one knuckle of the other series of staples and so on, thus making the equivalent of a hinge.

As regards the attaching of staples at the conveyor belt ends held between the top plate and lower plate of each joining staple, various means are used, with two means being the most common ones when considering the development of the related technology.

The most common staple attaching means consists of U-shaped clips made of round wire. Such clips include a back composed of a rectilinear round wire part extended at both ends by acute branches made of the same wire and bent at right angles with respect to the back. The spikes of the round wire branches are obtained by machining, i.e., milling or grinding. A second known means for attaching staples is composed of claws extending downward from the top plate of the staple. The clips made of U-shaped metal wire are inserted into holes provided in the top plate of the staples. The acute branches go through the end of the conveyor belt inserted between the top plate and the lower plate of the staple. The claws extending the top plate of the staple are directly inserted into the ends of the conveyor belt inserted between the two plates. Initially, the acute branches of the clips, when inserted through the thickness of the conveyor belt end, would meet corresponding holes provided in the other plate of the staple, then would go through such holes and be bent towards the outside of the lower plate of the staple. Similarly, the claws inserted along a similar path would also be bent towards the outside of the lower plate. This bend was made using an appropriately shaped matrix positioned under the lower plate.

The drawbacks of round wire clips lies in the fact that in order to have an excellent bending strength, it is necessary to increase the diameter of the clips. thus causing difficulties resulting from the thickness which could not be totally accommodated in a recess of the top plate of the staple and created problems with the scrapers. In addition, the clips made of round wire include branches, the end parts and spikes of which are made by grinding or milling and have mechanical properties that do not differentiate them from the rest of the clips, i.e., the back of the clips and the body of the branches. For bending the lower parts of the branches, steel wires are generally chosen, the mechanical properties of hardness and bending strength of which are intended to prevent breaking during the bending operations. Such properties are in contradiction with those that are required for the spikes of the branches to go without any difficulty and any deviation through the reinforcing frames of the elastomer material of the conveyor belts.

Figure 1:
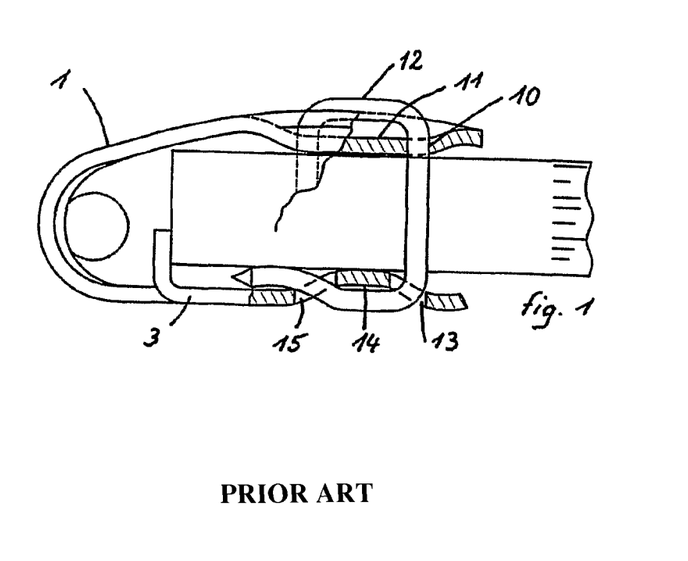
FIG. 1 is a side view, partially in section, of a staple and a clip made of steel wire according to European Patent No. EP 0 464 399.

It should be noted that, on the clip-staple assembly of European Patent No. EP 0 464 399, that the staple is provided in the top portion thereof with a recess making it possible to accommodate most of the thickness of the back of the clip (See, e.g., FIG. 1). However, a small over-thickness that is likely to be hit by the scrapers remains. If it is desired to increase the diameter of the round wire clip to obtain better strength, the problem becomes impossible to solve since it would be necessary to increase the thickness of the top plate of the staple, which can also be hit by the scrapers. Thus, It should be understood that the clips made of round wire cannot be perfected because of their basic design.

SUMMARY OF THE INVENTION

The present invention aims at providing new improved clips that eliminate such drawbacks and that further provide new advantages as regards the ease of implementation of new clip-staple systems as well as the robustness in use of such new clips. In addition, the present invention aims at providing versatility for positioning the claws of the clip that make it possible to create particular positioning and making it possible for the to resist forces exerted in various directions, depending on the utilization of the conveyor belt and, more particularly, in the case of troughing, for the conveying of bulk products.

Those goals are reached with a clip for joining staples for conveyor belts that comprise a top portion forming the back and claws that are substantially perpendicular to the top portion forming the back intended to go through holes correspondingly provided in the top plate of a joining staple of conveyor belts of the type having a U-shaped profile, including a top plate, a lower plate and one or several knuckles joining the top plate and the lower plate, characterised in that the top portion forming the back is composed of a sheet metal plate forming the back and by two or more claws which are substantially perpendicular to the sheet metal plate forming the back and which are connected thereto.

In a first embodiment, the claws are in one piece with the sheet metal plate forming the back, and provide extensions of said plate forming the back, which are perpendicular thereto and connected by a bending of the sheet metal of the plate forming the back.

In another embodiment, the claws of the clip are made of sheet metal parts or wire parts welded on the lower face on the sheet metal plate forming the back of the clip.

In both embodiments, the claws advantageously have a rectangular cross-section, the spike on the claw being an exception to such rectangular shape of the cross-section. The orientation of the larger side of the rectangular cross-section is advantageously oriented longitudinally with respect to the clip, but other orientations are possible as will be explained with respect to the preferred embodiments. In alternative solutions, the rectangular cross-section can be replaced by a cross-section having the shape of a trapezoid, a half circle, a rectangle having rounded or chamfered corners, or even by a circular cross-section in some embodiments.

In certain cases, the larger sides of the rectangular cross-section of the claws are symmetrical with respect to the longitudinal axis of the clip. In the case where some larger sides of the rectangular cross-sections are transversally oriented it can be advantageous for one or several claws to be wrapped around the longitudinal axis of the clip.

The larger sides of the claws' cross-section can also have various orientations, with some larger sides being oriented along an angle between these two orientations.

To obtain a better strength of the bending separating the top plate part from the corresponding claw, a re-entrant reinforcing rib embossed in the plate is provided, during the bending of the sheet metal, in the top portion of the claws close to the bend and extending into the bend, and in the part of the plate forming the back that is close to the bend. That rib is provided in the longitudinal direction of the claws, substantially in the middle of the claws width.

To have spikes with a better hardness and bending strength than the top portion forming the back, the spikes on the claws can be hammer-hardened during the manufacture thereof. A less intense hammer-hardening can also be provided on the stem part of the claws. Because the back and the claws can be made in sheet metal according to the invention, a mean quality metal can be used, with the stem and spike parts of the claws being hammer-hardened during the manufacturing of the clip on the press via cutting, bending, embossing and punching operations.

In order to make the provisional assembly of a clip and a staple easier, prior to the final attaching at the end of the belt conveyor, the present invention provides that at least some of the claws have a shallow horizontal groove on their external sides, embossed in the stem of the claw, the height of which is slightly above the thickness of the sheet metal of the top plate of the attaching staple, which the clip is intended for, and being located close to the leader of the spike part that shows an oblique plane area with respect to the general plane of the claw, said plane area starting from the very end of the claw and ending with a straight line close to the lower edge of the groove, the top edge of the groove being advantageously chamfered and the bottoms of the grooves of both opposite claws having a spacing that corresponds to the spacing of the edges located on the outermost side of the holes in the top plate of the joining staples for which the clip is intended.

It is also possible to provide grooves on the innermost sides of the claws, the groove in each claw being horizontal and shallow and embossed in the stem of the claw with a height that is slightly larger than the thickness of the metal sheet of the top plate of the joining staple that the clip is intended for, and being located close to the leader of the spike part that has an oblique plane area with respect to the general plane of the claw, said plane area starting from the very end of the claw and ending with a straight line close to the lower edge of the groove with the top edge of the groove being advantageously chamfered and the bottoms of the grooves of two opposite claws having a spacing that corresponds to the spacing of the edges on the innermost side on the holes on the top plate of the joining staple for which the clip is intended.

It is thus possible to snap-fit the holes on the edges of the holes of the top plate on the staples, the clip-staple assembly being ready for the engagement of the claws using a hammer and a hydraulic punch or a pneumatic punch. The chamfer provided on the top edge of the groove aims at facilitating the sliding on the edge of the hole, since a right angle edge would tend to catch the edge of the hole upon the engagement. Similarly, the oblique area of the spike mentioned hereabove allows the engagement of the claw into the hole while causing a resilient motion of the claw stem, such motion being reverted upon the snap-fitting of the groove with the edge of the hole of the top plate of the staple.

Thanks to the design of the clip, the orientations of the claws can be selected as necessary, depending on the constraints provided for the joining. Several preferred embodiments of the invention, which are not limitative, will now be described while referring to the drawing, the figures of which are summarized hereinafter.

DETAILED DESCRIPTION OF EXEMPLARY EMBODIMENTS

Several preferred embodiments, which are not limitative, showing clips according to the invention will now be described while referring to the figures.

FIG. 1 is a drawing of a clip-staple system according to patent EP 0 464 399 mounted on one end of the conveyor belt and shows a clip made of round wire 12, a staple 1 including a top plate having a recess 11 and a lower plate 3 having a bridge 14, and holes 10, 13 and 15 provided for the passage of the branches of the wire clip having two generally U-shaped branches.

Figure 2:
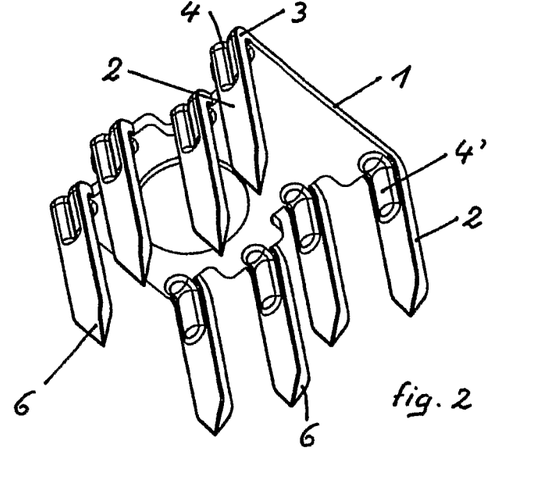
FIG. 2 is a perspective view of one embodiment of the clip according to the invention.

FIG. 2 shows an embodiment of the clip according to the invention. The clip includes a top portion forming the back 1 and six claws 2 connected to the back 1 at bends 3, wherein the claws 2 further include re-entrant ribs 4, re-entrant parts 4', stems 7, and spikes 6. As will be easily understood by the person skilled in the art and in the machining of metals, this clip can be obtained by a machining with a press, by cutting, punching, and/or embossing operations. When carrying out these operations, the spikes 6 and, if need be, the stems 7 of the claws 2 can easily be punched so that they can have a hardness and a bending strength higher than those of the basic metal. It should also be understood that the very design of the clip makes it possible to provide a number of claws 2 greater than two on the same part forming the back 1, which can even reach, if so desired, for example, ten claws. The embodiment shown includes six claws 2 positioned in the longitudinal direction. It should be noted that such embodiment advantageously provides shifts as regards the positioning of the claws in a transverse direction. Such shifts make it possible to prevent the creation of longitudinal lines showing the breaking in the frame of the end of the conveyor belt as the clips experience forces and jerks in the longitudinal direction. Such possible breaking lines would result from drillings aligned in the longitudinal direction, which would be caused by nonshifted claws in the transversal direction because such drillings would be too close to each other in the longitudinal direction.

In the following description of the embodiments of the invention, the same references will be used for similar parts of the clips and/or staples. Conventionally, the longitudinal direction of the clips or staples is that of the conveyor belt on which the clip and the staple must be mounted, whatever the dimensions of the clips and the staples. Similarly, the transversal direction will be the direction perpendicular to the longitudinal direction, whatever the dimensions of the clips and the staples. And, the longitudinal direction of the claws will be that of the larger dimension thereof.

Figure 3:
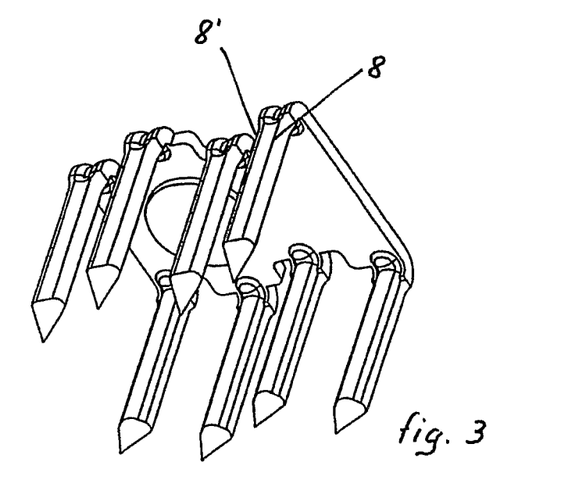
FIG. 3 is a perspective view of another embodiment of the clip according to the invention.

FIG. 3 shows another embodiment of the clip according to the invention, wherein the stems 7 of the claws 2 have a section that is not strictly rectangular since both external angles 8 and 8' of the section is chamfered. In this case too, that form can be obtained during the manufacture via a coining operation.

Figure 4:
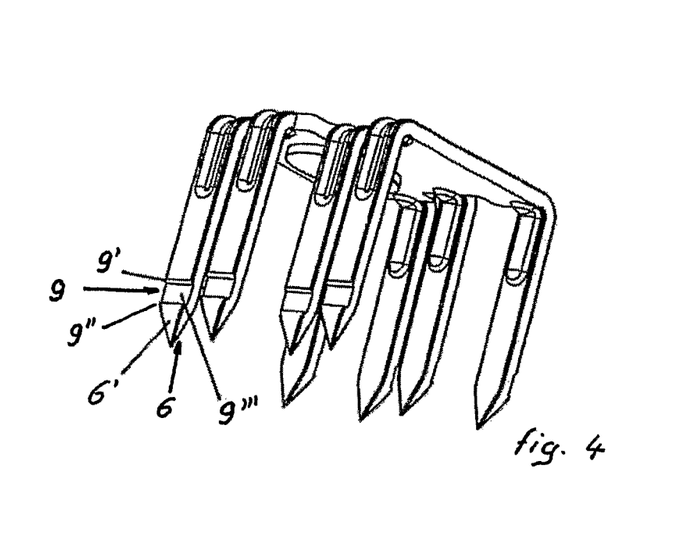
FIG. 4 is a perspective view of a clip similar to that of FIG. 2, but including snapping grooves.

FIG. 4 shows another embodiment of the clip according to the invention that is similar to that of FIG. 2, but wherein grooves 9 are provided in the claws 2. Such grooves 9 are shallow and they can be obtained in the course of the manufacture of the clip via a coining operation. The grooves 9 include a top edge 9', a bottom 9", and a lower edge 9'''. The lower edge 9''' is close to an oblique part 6' of the spike 6 that extends from the spike 6 up to the vicinity of the lower edge 9''' of the groove 9.

Figure 5:
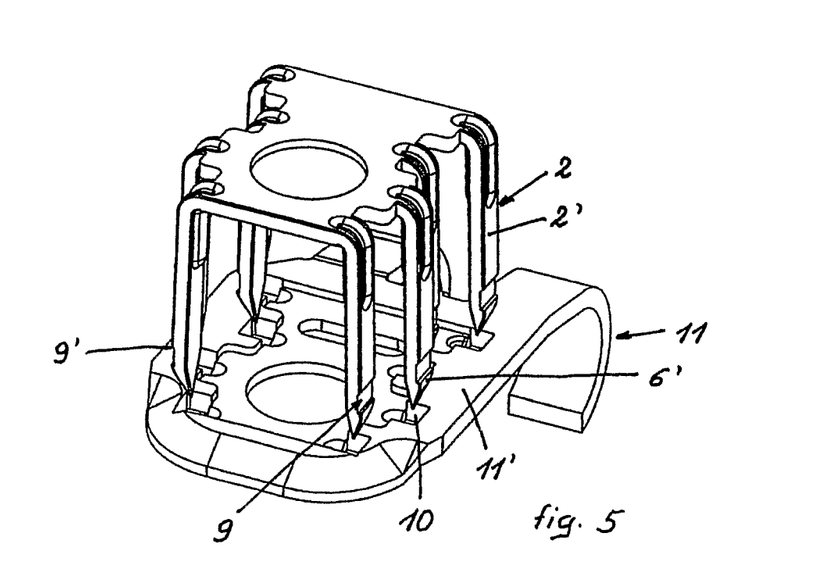
FIG. 5 is a perspective view of a clip according to FIG. 4, ready to be inserted into the corresponding holes of the top plate of the staple.

FIG. 5 shows the clip according to the invention of FIG. 4, ready to be inserted into the through holes 10 provided in the top plate 11' of a joining staple 11 of a conveyor belt, such holes 10 having a edges 10' corresponding to and adapted engage the top edge 9' and the lower edge 9''' of the grooves 9 of the claws 2.

Figure 6:
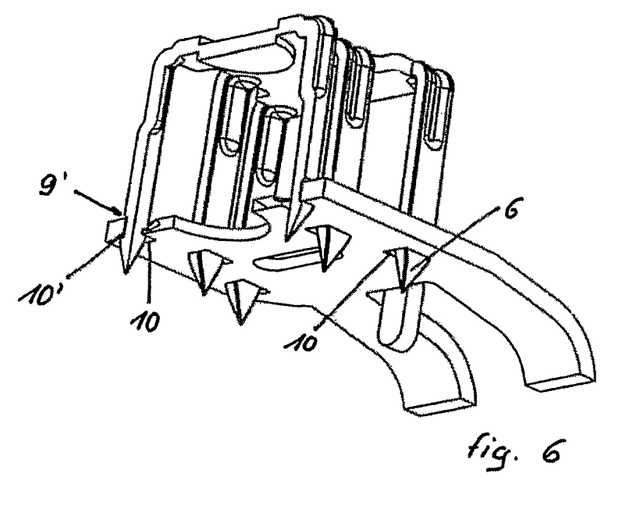
FIG. 6 is a perspective view showing a segment of a clip according to FIG. 4 and a fragment of a staple, with the clip being snap-fitted using the grooves of its claws in the edges of the holes of the top plate of the staple.

FIG. 6 shows the clip according to the invention of FIG. 5 snap-fitted with the edges 10' of the through holes 10 being engaged in the grooves. Upon the snap-fitting of the grooves 9 in the holes 10, the oblique part of the spikes 6 of the claws 2 temporarily deform the claws 2 elastically by sliding on the edges 10' of the holes 10. And, when the holes 10 engage the grooves 9 of the claws 2 in a snap-fitted, the claws 2 return to their original shape. That makes it possible to provide clip-staple assemblies that are ready to be mounted on the end of the conveyor belt.

As illustrated in FIGS. 4, 5, and 6, the top edge 9' of the groove 9 is chamfered. That chamfer aims at preventing the top edge 9' of the groove 9 from catching the edge 10' of the hole 10 of the top plate 11' of the staple 11 when the claws 2 are subsequently pressed at the end of the conveyor belt and allows the smooth positioning of the claws 2 by pressing on them.

Figure 7:
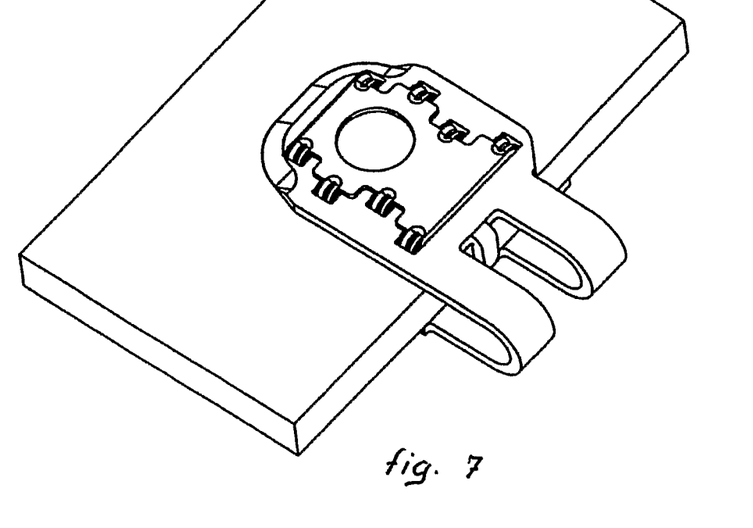
FIG. 7 is a perspective view showing a staple mounted on one end of a conveyor belt, the top portion forming the back of the clip being buried in a recess of the top plate of the staple, and a part of the bends of the claws being visible.

FIG. 7 shows a staple mounted on the end of the conveyor belt. It should be noted that the clip according to the invention is almost totally engaged in a recess of the top face of the top plate of the staple. Such a clip that is correctly attached by the multiple staples thereof is protected against the stripping caused by the scrapers during the operation of the conveyor belt. Something important should be noted here. Thanks to the design of the clip according to the invention in all the embodiments thereof, the top plate can be relatively thin, which makes its accommodation in the recess 16 of the top plate 11' of the staple 11 easier, whereas the claws obtained by cutting and bending the sheet metal of the top plate can have a large section by using a rectangular shape or other shape as mentioned above and having dimensions in the transverse section of the claw much larger than those of the other dimensions that correspond to the thickness of the top plate 11'. In the case of claws 2 welded to the top portion forming the back 1, the selection of the cross-section of the claws 2 can be varied since while still providing the advantages of the multiple-claw clip of the invention because the top portion forming the back 1 can have a relatively thin thickness that is easily buried in the top plate 11' of the staple 11.

Figure 8:
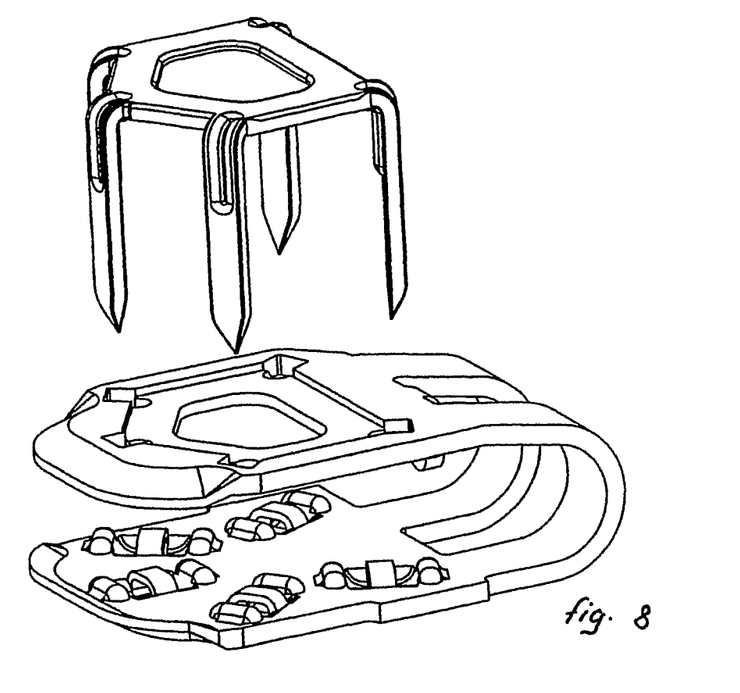
FIG. 8 shows another embodiment of the clip and a corresponding staple.

FIG. 8 shows another embodiment, a so-called star embodiment, of the clip according to the invention. It should be noted that the orientations of the claws are varied. Such plurality of orientations makes it possible for the positioned staples to behave properly in the case where the conveyor belt is submitted to forces and jerks oriented in various directions and, more particularly, in the case of a conveyor belt intended for the transport of bulk materials.

Figure 9:
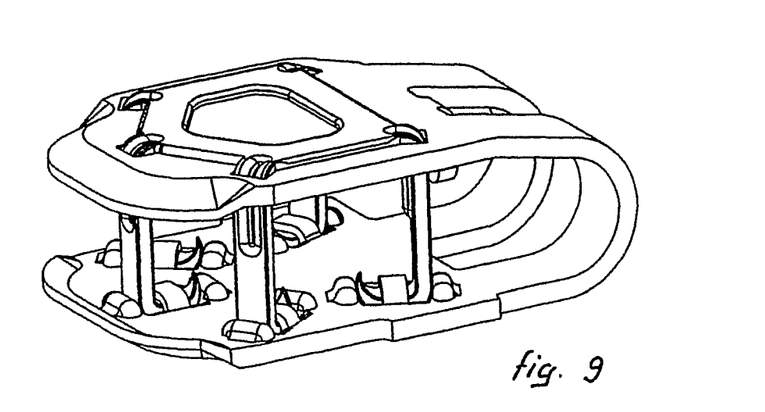
FIG. 9 shows a clip according to FIG. 8 mounted on a corresponding staple.

FIG. 9 shows the same staple and the same clip as FIG. 8 with the clip being in the final position thereof in the staple.

The invention thus reaches all the initially aimed at goals, i.e., easy manufacture using tools well known to persons skilled in the art, without any cold lap, of a strong multiple-claw clip that includes a relatively thin back that can be easily accommodated without extending from the top plate of the clip of the staples. The claws can have hardness and bending strength properties that are different from those of the part forming the back of the clip, without any cold lap after the manufacturing of the clip through working on the press and using a mean quality metal thanks to different hammer-hardening that can be obtained without any cold lap and carried out using the tool for manufacturing the clip. Accordingly, the versatility of the permissible configurations, without departing from the scope of the invention, is particularly remarkable.

What is claimed is:

1. A clip for attaching a staple that joins conveyor belt ends, comprising:
    a top portion and a plurality of claws positioned in a longitudinal direction with respect to said top portion and extending substantially perpendicular from said top portion, said plurality of claws being adapted to extend through corresponding holes in the staple, and said plurality of claws providing shifts in a transversal direction with respect to said top portion,
    the top portion is formed of a metal sheet, the configuration of which corresponds to that of an accommodation recess provided in a top plate of the staple, said top portion bearing, on the periphery thereof, at least two claws of said plurality of claws, each of said claws being connected to the top portion by a bend, each of said bends including a re-entrant reinforcing rib embossed therein, each reinforcing rib being provided in the longitudinal direction of the respective claw approximately in the middle of the width of the respective claw,
    wherein the claws are formed either by bending the metal sheet at said bends or by attaching the claws to the metal sheet.

2. A clip according to claim 1, wherein
ends of the claws include spikes that are hammer-hardened during the manufacture thereof and have a hardness and a bending strength above those of the other parts of the claws and that of the metal sheet forming the top portion.

3. A clip according to claim 2, wherein
each of the claws include a stem part that has been hammer-hardened during the manufacture thereof and has a hardness and a bending strength above those of the metal sheet but lower than that of the spikes.

4. A clip according claim 2, wherein
at least one claw has a shallow horizontal groove embossed in a stem of the claw near the spike which has a plane oblique area with respect to the general plane of the claw, the plane area starting from the spike of the claw and ending with a straight line close to the lower edge of the groove with the top edge of the groove being chamfered.

5. A clip according to claim 1, wherein
the claws have a substantially rectangular shaped section.

6. A clip according to claim 1, wherein
at least two of the plurality of claws extend from opposite sides of the metal sheet.

7. A clip and staple assembly for joining conveyor belt ends, comprising:
a staple having a U-shaped profile and including a top plate, a lower plate, and at least one knuckle joining the top and lower plates, the top plate having an accommodation recess and a plurality of holes; and
a clip having a top portion formed of a metal sheet and a plurality of claws positioned in a longitudinal direction with respect to said top portion and extending substantially perpendicularly from the top portion, said plurality of claws being adapted to extend through the holes of the top plate of the staple, and said plurality of claws providing shifts in a transversal direction with respect to said top portion,
the top portion having a configuration that corresponds to that of the accommodation recess of the staple, each of the claws including a reinforcing rib embossed therein that is provided in the longitudinal direction of the respective claw,
wherein the claws are formed either by bending the metal sheet or by attaching the claws to the metal sheet.

8. a clip and staple assembly according to claim 7, wherein
each of the claws including a groove in a lower part thereof, the grooves of the claws being snap-fitted on edges of the holes of the top plate of the staple.

9. A clip and staple assembly according to claim 8, further comprising
spikes at ends of the claws passing under a lower face of the top plate of the staple.

10. A clip and staple assembly according to claim 9, wherein
at least two of the plurality of claws extend from opposite sides of the metal sheet.

* * * * *